United States Patent
Knipp

(10) Patent No.: US 10,766,182 B2
(45) Date of Patent: Sep. 8, 2020

(54) EXTRUSION PARISON HEAD FOR DISCONTINUOUS FOAMING

(71) Applicant: W. MÜLLER GMBH, Troisdorf (DE)

(72) Inventor: Guido Knipp, Lohmar (DE)

(73) Assignee: W. MÜLLER GMBH, Troisdorf (DE)

( * ) Notice: Subject to any disclaimer, the term of this patent is extended or adjusted under 35 U.S.C. 154(b) by 1209 days.

(21) Appl. No.: 14/895,058

(22) PCT Filed: Jun. 4, 2014

(86) PCT No.: PCT/EP2014/061533
§ 371 (c)(1),
(2) Date: Dec. 1, 2015

(87) PCT Pub. No.: WO2014/195337
PCT Pub. Date: Dec. 11, 2014

(65) Prior Publication Data
US 2016/0101555 A1    Apr. 14, 2016

(30) Foreign Application Priority Data
Jun. 4, 2013   (DE) .................. 10 2013 105 749

(51) Int. Cl.
*B29C 48/30*     (2019.01)
*B29C 48/00*     (2019.01)
(Continued)

(52) U.S. Cl.
CPC ............ *B29C 48/30* (2019.02); *B29B 7/7414* (2013.01); *B29C 44/3446* (2013.01);
(Continued)

(58) Field of Classification Search
None
See application file for complete search history.

(56) References Cited

U.S. PATENT DOCUMENTS 3,687,582 A     8/1972   Hendry et al.
4,134,687 A *   1/1979   Eckardt ............... B29C 44/0492
                                                        366/76.3
(Continued)

FOREIGN PATENT DOCUMENTS

DE     2821333     11/1978
DE     4316863     11/1994
(Continued)

*Primary Examiner* — Jeffrey M Wollschlager
*Assistant Examiner* — Armand Melendez
(74) *Attorney, Agent, or Firm* — Duane Morris LLP; Gregory M. Lefkowitz

(57) ABSTRACT

Extrusion head 1 for manufacturing hose-like parisons from an extruded plastic material, which are made up from at least one first layer and a second layer, wherein the extrusion head 1 comprises the following:
a first manifold 15 with a connection 2 for a first extruder,
a second manifold 19 with a connection 8 for a second extruder 3,
a first flow channel 17 with an annular first outlet opening 18 for producing a first layer, wherein the first flow channel 17 is fed by the first manifold 15,
a second flow channel 21 with an annular second outlet opening 22 for producing a second layer, wherein the second flow channel 21 is fed by the second manifold 19, and
a mixer 27 within the second flow channel 21 with a connection 54 for introducing a foaming agent.

15 Claims, 3 Drawing Sheets

Figure 1:
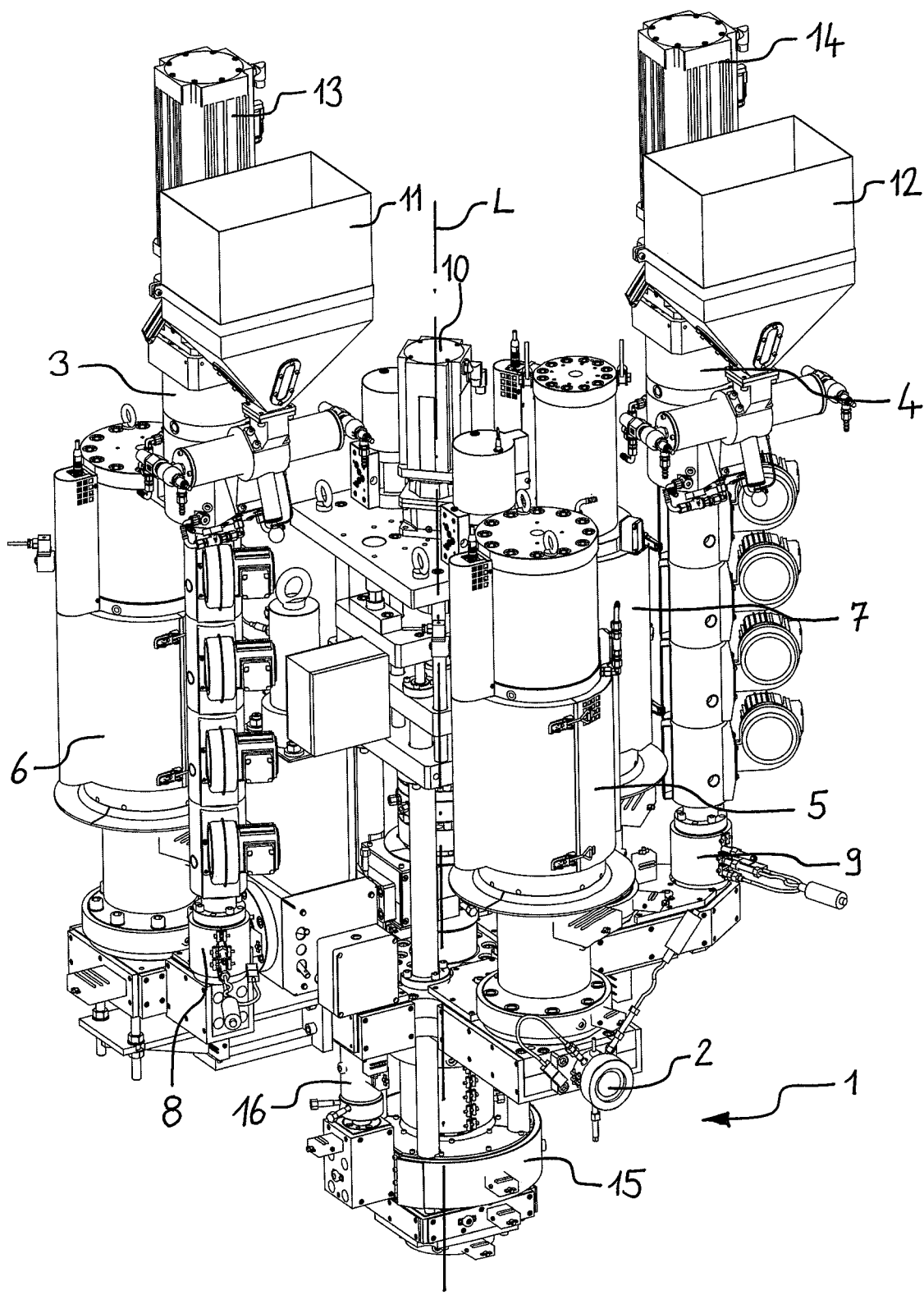

(51) Int. Cl.
  *B29C 48/335* (2019.01)
  *B29C 48/09* (2019.01)
  *B29C 49/04* (2006.01)
  *B29C 44/34* (2006.01)
  *B29B 7/74* (2006.01)
  *B29C 48/70* (2019.01)
  *B29L 23/00* (2006.01)
  *B29K 101/12* (2006.01)
  *B29K 105/04* (2006.01)

(52) U.S. Cl.
  CPC ...... *B29C 48/0012* (2019.02); *B29C 48/0017* (2019.02); *B29C 48/09* (2019.02); *B29C 48/338* (2019.02); *B29C 48/705* (2019.02); *B29C 49/041* (2013.01); *B29C 2049/047* (2013.01); *B29C 2049/048* (2013.01); *B29K 2101/12* (2013.01); *B29K 2105/04* (2013.01); *B29L 2023/00* (2013.01)

(56) References Cited

U.S. PATENT DOCUMENTS

| | | | | |
|---|---|---|---|---|
| 4,548,776 | A | * | 10/1985 | Holdredge, Jr. ........ B29B 7/405 264/50 |
| 4,783,299 | A | | 11/1988 | Prevotat |
| 4,846,648 | A | | 7/1989 | Spence et al. |
| 2002/0094431 | A1 | * | 7/2002 | Roderick ............. B32B 1/08 428/317.9 |
| 2003/0077347 | A1 | * | 4/2003 | Miebach ............. B29C 48/30 425/133.1 |
| 2004/0009250 | A1 | * | 1/2004 | Schuermann ....... B29C 44/0492 425/4 R |
| 2005/0132782 | A1 | * | 6/2005 | Wallevik ............. B01F 7/063 73/54.28 |

FOREIGN PATENT DOCUMENTS

| | | |
|---|---|---|
| DE | 19959482 | 6/2001 |
| EP | 0463759 | 1/1992 |
| JP | S5428427 | 9/1979 |

\* cited by examiner

EXTRUSION PARISON HEAD FOR DISCONTINUOUS FOAMING

CROSS-REFERENCE TO RELATED APPLICATIONS

This application is a § 371 national stage entry of International Application No. PCT/EP2014/061533, filed Jun. 4, 2014, which claims priority to German Patent Application No. 10 2013 105749.7 filed Jun. 4, 2013, the entire contents of which are incorporated herein by reference.

The invention relates to an extrusion head for producing hose-like or pipe-like parisons from extrudable plastics, which are made up from at least one first layer and a second layer, especially for the blow moulding technique. The invention relates further to an extrusion machine with such an extrusion head and a method for operating such an extrusion head.

The blow moulding technique, especially the extrusion blow moulding, serves for manufacturing hollow bodies from thermoplastic plastics, like for example for containers or containers of any type. In this case, a hose-like or pipe-like parison is produced by extrusion. Subsequently, the parison is adapted in a blow mould to the inner contour of the blow mould by means of introducing an internal pressure. After the setting of the extruded material, the blow mould can be opened and the end product can be taken out. For the extrusion, at least one extruder is provided, in which the thermoplastic plastic material is plasticized. The, thus, produced extruded material is transported to the extrusion head, in which it is formed to a tube-like parison. In the present case, at least two layers are provided, to produce a multi-layered parison. Generally also more than two layers are possible.

A variety of such tube dies is known. For example, EP 0 770 469 B1 shows a tube die for producing a parison with a multitude of layers, wherein the extrusion head can be simply adapted to different requirements and to different numbers of layers.

From DE 26 23 308 C3 an extrusion head is known for discontinuously producing parisons from thermoplastic plastic material with a closed outer skin from compact plastic and a porous core of foamed plastics. In this case, the extrusion head is connected to an extruder, which feeds the extrusion head with plasticized plastic. Within the extrusion head, the flow of the extruded material is split into different flow channels, which serve for producing different layers. In one of the flow channels, a foaming agent is introduced into the extruded material, to foam one of the layers.

From DE 2 241 002 A an extrusion head is known for injection moulding plastic components with a smooth surface and porous core. Within one first extruder, the thermoplastic plastic material is provided with a foaming agent and is fed to the extrusion head. By means of a second extruder, a thermoplastic plastic material is fed to the extrusion head, wherein the thermoplastic material is not foamed. The two extrusion flows from the two extruders serve for producing two different layers, which are introduced into an injection mould. In this case, the two extrusion flows are introduced into the injection mould such, that a component with a smooth outer face and a porous core is produced.

U.S. Pat. No. 4,548,776 shows an extrusion head, which is connected via a feed line to an extruder and a storage. Between the feed line and a nozzle of the extrusion head a mixing element is provided, in which via a further feed line a foaming agent, for example a gas, is introduced into the extruded material. Within the mixing element a dynamic mixer is provided, which has radially projecting mixing blades and is arranged rotatably. The mixer serves for mixing the extruded material with the foaming agent.

Object of the present invention is, to provide an extrusion head and a method for operating the extrusion head, wherein parisons, especially for the blow moulding technique, can be produced, which have a foamed layer. In this case, it should be possible to use common extruders, so that for producing the parisons with a foamed layer no adaptation of the extruder has to be carried out.

The object is met according to the invention by an extrusion head for manufacturing hose-like parisons from extrudable plastic, which are made up from at least a first layer and a second layer, wherein the extrusion head comprises the following:
a first manifold with a connection for a first extruder,
a second manifold with a connection for a second extruder,
a first flow channel with an annular first outlet opening for producing the first layer, wherein the first flow channel is fed by the first manifold,
a second flow channel with an annular second outlet opening for producing the second layer, wherein the second flow channel is fed by the second manifold, and
a mixer within the second flow channel with a connection for introducing a foaming agent.

In this case, it is advantageous, that for each layer a manifold is provided, which is connectable to a separate extruder. Thus, for each layer a different material can be used. Furthermore, within the extrusion head a mixer is provided, in which a foaming agent is introduced into the extruded material of the second flow channel and is mixed. Thus, none of the extruders has to be especially adapted, to ensure a foaming of the extruded material. Thus, common extruders can be used, which possibly can already be available at an operating company of the blow moulding machine. A conversion to the manufacture of parisons with a foamed layer can, thus, be achieved solely by exchanging the extrusion head.

Preferably, the mixer is a dynamic mixer, as by means of this, a mixing of the extruded material with the foaming agent can be carried out particularly efficient. In this case, the mixer has a shaft-like mixing element, rotatingly drivable around a longitudinal axis of the extrusion head and which is arranged within a bore of a mixer housing. An annular channel portion is formed between the bore of the mixer housing and the mixing element, wherein the annular channel portion is part of the second flow channel.

Preferably, mixing blades are arranged on an outer circumferential face of the mixing element. Mixing blades, which interact with the mixing blades of the mixing element, are provided on an inner circumferential face of the bore of the mixer housing, to ensure the most efficient mixing of the extruded material with the foaming agent.

On the mixer housing, a connection for introducing a foaming agent can be provided, wherein a feed line for the foaming agent leads to the annular channel. The connection for introducing the foaming agent is arranged in this case preferably at an upstream end of the mixer housing, so that the foaming agents flows through the mixer with the longest possible path. Thus, the most efficient mixing is ensured if possibly along the whole length of the mixer.

Downstream of the mixer, a bore-like channel portion of the second flow channel can be provided, wherein the material flow out of the annular channel of the mixer is united in the bore-like channel portion. This can facilitate the homogenization of the material flow of the extruded material. Initially, within the mixer, the extruded material is mixed with the foaming agent by means of the mixing blades on a relatively large circumference, wherein the largest possible circumference provides high circumferential velocities of the mixing blades and thus, facilitates a thorough mixing. The parison-like material flow or the annular channel portion can then be united in a bore-like channel portion, in which the material of the mixer is again homogenized and then is again transferred into an annular channel in a parison-like manner.

Preferably, a servo-motor for driving the mixer with a variable number rotational speed is provided, so that the mixing result and thus the fineness of the pores, which are produced by the foaming agent, can be varied in a simple manner.

It has been proven, that it is advantageous, when generally a pre-defined pressure is maintained within the material flow for the foamed layer, i.e. within the second flow channel. For this, it can be provided, that the cross-sectional area of the second flow channel continuously decreases from the mixer in direction towards the second outlet opening. Because of the low viscosity of the extruded material during the pressing of the extruded material into the extrusion head a higher pressure is produced upstream than downstream, when generally the cross-sectional area of a flow channel remains constant. To ensure a sufficient pressure also downstream within the extrusion head, the cross-sectional area continuously decreases towards the outlet opening. Thus, it is prevented, that the foaming agent leads already within the extrusion head to large pores. It is rather ensured, that an expansion of the pores and thus the actual foaming takes place especially after the extruded material has exited from the extrusion head.

When using the extrusion head in the blow moulding technique, a discontinuous extrusion of the parison-like preforms is ensured, as after ending the extrusion of the parison this is inflated in a blow mould. During the blowing process, no further extruded material is allowed to exit the extrusion head. Thus, generally a storage head or a separate temporary storage is provided. Thus, the extruders can continuously deliver thermoplastic plastic material, wherein during the blowing process the extruders deliver the extruded material to the temporary storage, from which the extruded material can be delivered after finishing the blowing process again to the extrusion head. To prevent a pressure reduction within the extrusion head for the second layer during the blowing process, a shut-off valve can be provided upstream of the mixer, so that the pressure is maintained constant within the second layer. For this, also the second outlet opening is closable, as commonly known.

The second outlet opening can generally be arranged downstream of the first outlet opening. The second outlet opening can be arranged such, that the second layer is arranged within the first layer. Thus, a first outer smooth layer is ensured, wherein the second layer is arranged on the inside of the first layer.

The extrusion head can further have a third manifold with a connection for a third extruder. A third flow channel is then provided with an annular third outlet opening for producing a third layer, wherein the third flow channel is fed by the third manifold. Thus, a three-layered parison can be manufactured. In principle, also further manifolds and further flow channels are possible for producing further layers.

In this case, the third outlet opening is formed such, that the third layer is arranged within the second layer. Thus, a parison is achieved with a smooth outer layer, a smooth inner layer and a foamed layer arranged therebetween.

In a first embodiment it can be provided, that the second outlet opening is arranged downstream of the third outlet opening. In this case, downstream of the third outlet opening of the second flow channel and the third flow channel are united, so that the second layer and the third layer exit together from the second outlet opening.

In a second embodiment it can be provided, that the first outlet opening is arranged downstream of the second outlet opening and of the third outlet opening. Downstream of the second outlet opening, the first flow channel and the third flow channel merge, wherein the second outlet opening is closable. When the second outlet opening is open, all flow channels merge. When the second outlet opening is closed, thus, the first layer and the third layer exit together from the first outlet opening. When the second outlet opening is open, the first layer, the second layer and the third layer exit together from the first outlet opening.

The object is further met by an extrusion machine with an extrusion head as described above, wherein each manifold is assigned to a temporary storage for the extruded material.

Furthermore, the object is met by a method for operating an extrusion head or an extrusion machine as described above, in which the pressure within the second flow channel is held at a defined value.

Preferably, when the pressure within the second flow channel falling below the defined value, the pressure is regulated by means of adapting the expelling velocity of a second temporary storage for the extruded material arranged in front of the extrusion head. Thus, by means of regulating the expelling velocity, the pressure within the second flow channel can be controlled.

Furthermore, it can be provided, that the temperature within the second flow channel is adjusted to a different value than within the other flow channels. This is especially important, when the viscosity of the second layer differs from the viscosities of the other layers by means of introducing the foaming agents. By means of regulating the temperature it can be ensured, that the viscosity of the second layer can be adapted to the viscosity of the residual layers.

Figure 2:
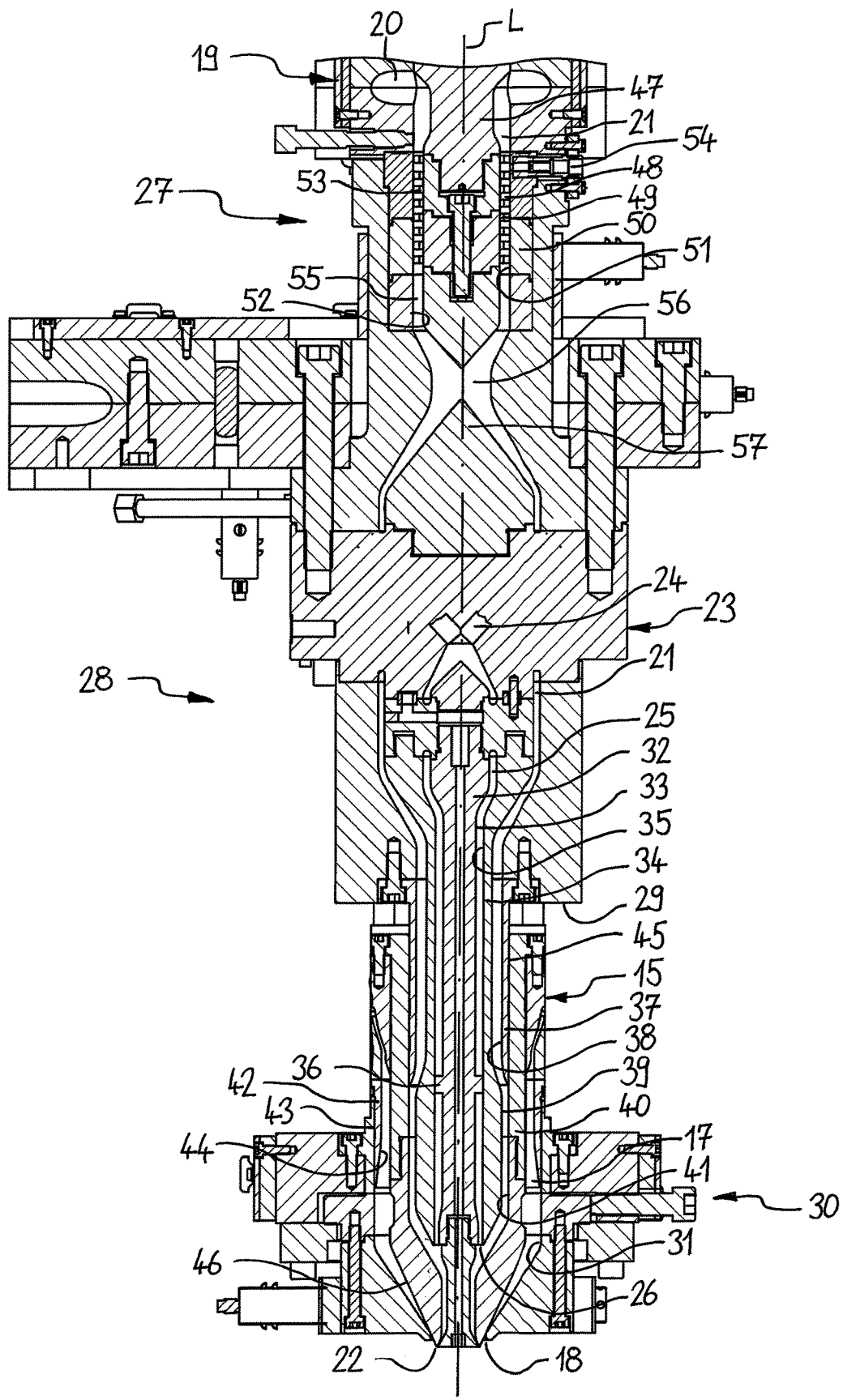
Figure 3:
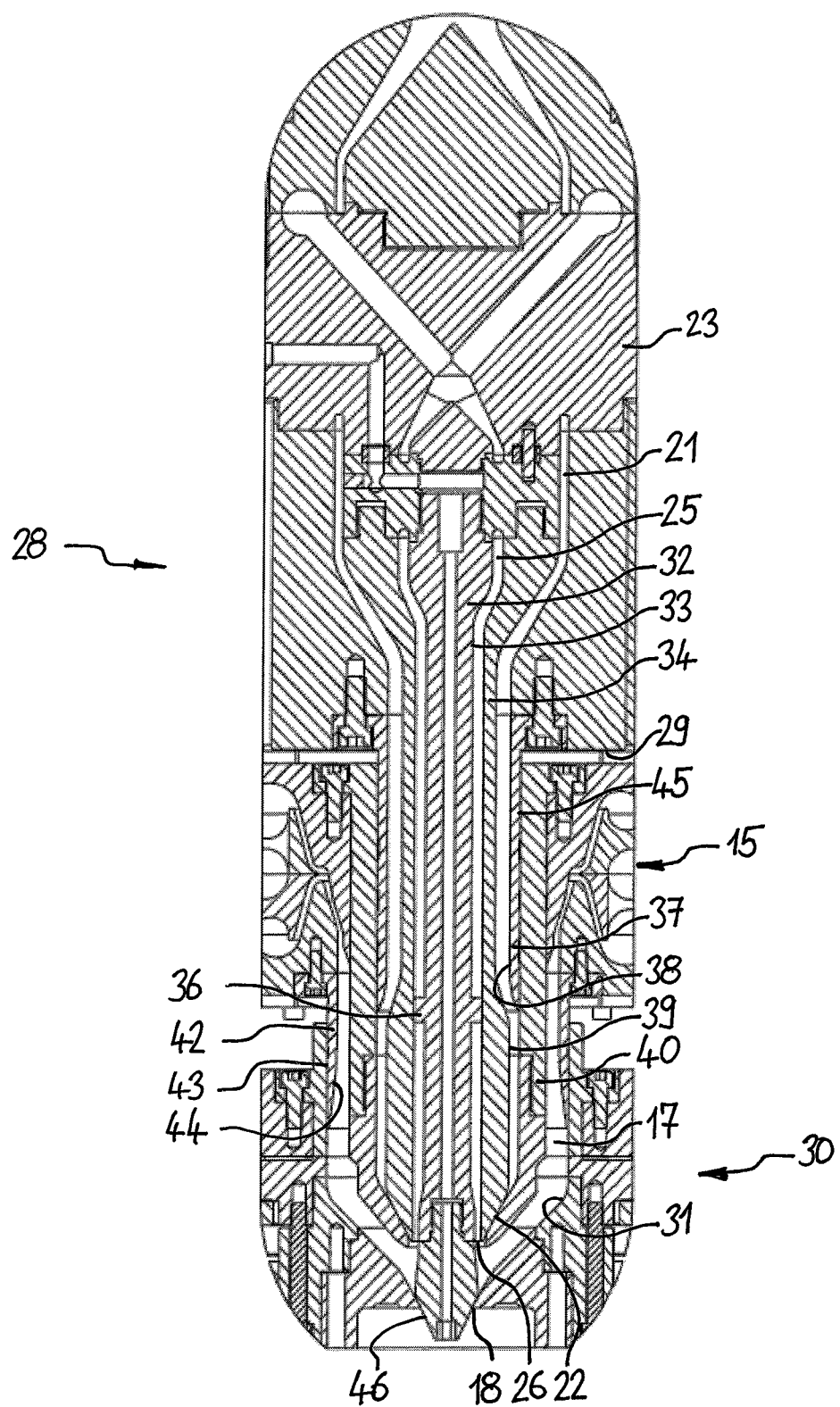

A preferred embodiment is described in more detail in the following using the figures. Herein it shows:

FIG. 1 a perspective representation of an extrusion machine,

FIG. 2 a longitudinal sectional view through the extrusion head of the extrusion machine of FIG. 1 in a first embodiment and FIG. 3 a partial longitudinal sectional view through the extrusion head of the extrusion machine of FIG. 1 in a second embodiment.

FIG. 1 shows a perspective illustration of an extrusion machine with an extrusion head 1 according to the invention. The extrusion head 1 has a connection 2 for a first extruder, not shown here, i.e. often a machine extruder which is already available at the operating company of the machine. The first extruder serves for forming a first layer of a tube-like parison. Furthermore, a second extruder 3 is provided as an additional extruder which serves for forming a second layer. Furthermore, a third extruder 4 is provided as an additional extruder, which serves for forming a third layer. Generally, also further extruders can be provided. As described later, the extrusion head 1 is formed such, that the first layer is the outer layer, the second layer is the center layer and the third layer is the inner layer, wherein the second layer is foamed.

To each extruder 3, 4 a temporary storage 5, 6, 7 is assigned. Thus, in flow direction of the extruded material downstream of the first extruder, a first temporary storage 5 is assigned, a second temporary storage 6 is assigned to the second extruder 3 and a third temporary storage 7 is assigned to the third extruder 4. The temporary storages 5, 6, 7 are formed as cylinder piston units, so that the respective extruder extrudes initially the extruded material into the cylinder of the respective temporary storage and from there the extruded material flows further via flow channels to the extrusion head 1. Thus, a discontinuous extruding of the parison is possible. In the blowing technology it is necessary, that initially a parison is extruded. For this, the extruded material is delivered continuously from the extruders, so that a parison exits continuously from the extruder head 1. As soon as the parison is finally being formed, this has to be blown up by means of a blow mould, not shown here. During the blowing step, no extruded material is allowed to exit from the extruder head. The extruders 3, 4 however, have to operate further continuously. The extruded material extruded from the extruders 3, 4 is then fed into the temporary storages 5, 6, 7 and is stored in the cylinders of the temporary storages 5, 6, 7, wherein a piston moves upwards in the orientation of the extrusion machine shown in FIG. 1, so that the cylinder chamber is enlarged. As soon as the parison is blown and has been removed from the blow mould, the pistons of the individual temporary storages 5, 6, 7 are moved again downwards, so that the extruded material is transported from the temporary storages 5, 6, 7 to the extrusion head.

The second extruder 3 is connected via a connection 8 to the extrusion head 1. The third extruder 4 is connected via a connection 9 to the extrusion head 1. The first extruder (not shown here) is generally arranged horizontally and is connected to the connection 2. The second extruder 3 and the third extruder 4 are arranged vertically and extrude vertically downwards. In this case, the extruders have feed hoppers 11, 12 into which the granular thermoplastic plastic material can be fed. Driving motors 13, 14 serve for driving the extruders 3, 4.

Within the extrusion head 1 the plasticized plastic material of the second layer, which is extruded by the second extruder, is mixed with a foaming agent. A dynamic mixer, which is described in detail in the following, serves for this. A servomotor 10 is provided for driving the dynamic mixer.

Generally the extrusion head 1 is also arranged vertically, wherein the extruded material is expelled vertically downwards.

FIG. 2 shows a longitudinal sectional view of a first embodiment of the extrusion head 1 and is described in the following together with FIG. 1.

The extrusion head 1 has in its lower area a first manifold 15, which is connected to the first extruder, not shown here. The first manifold, which is formed in a known manner as a ring manifold, is connected via a feed line 16 to the first extruder. The first feed line 16 merges in its further extension into an annular first flow channel 17, which extends up to a first outlet opening 18, which is shown here closed, so that the extruded material for the first layer exits at the first outlet opening 18 from the extrusion head 1. The first outlet opening 18 forms, thus, a first annular nozzle.

In an upper area of the extrusion head 1, a second manifold 19 is provided, which is connected to the second extruder 3, wherein a second feed line 20 leads to an annular second flow channel 21. Within the second flow channel 21, a mixer 27 is provided. Downstream of the mixer 27, the second flow channel 21 extends downwards up to a second outlet opening 22, which is also shown in the closed condition and forms a second annular nozzle, from which the extruded material of the second layer exits.

Furthermore, a third manifold 23 is provided, which is connected to the third extruder 4. Via a third feed line 24, the extruded material of the third extruder 4 is delivered to an annular third flow channel 25. The third flow channel 25 ends in a third outlet opening 26, which is arranged within the extrusion head 1 and merges with the second flow channel 21.

The extrusion head 1 has a base portion 28, which contains the second manifold 19 for the second layer and the third manifold 23 for the third layer. The base portion 28 is essentially formed elongated in direction of a vertically orientated longitudinal axis L. At a vertical upper end, the mixer 27 is connected to the base portion 28. The base portion 28 ends vertically downwards in an end face 29 facing downwards.

A head portion 30 is connected axially displaceably to the base portion 28. The first outlet opening 18 in the shape of an annular nozzle and the second outlet opening 22 also having the shape of an annular nozzle are arranged facing vertically downwards, so that the parison is extruded and can be formed vertically downwards from the head portion 30.

The head portion 30 is pierced in longitudinal direction by a through opening having an inner circumferential face 31. On the base portion 28, a central mandrel 32 is mounted, which extends axially and projects beyond the end face 29 and extends in its extension through the head portion 30 and projects vertically downwards over the head portion 30. On the base portion 28, furthermore, a mandrel tube 34 is mounted, which is arranged coaxially to the mandrel 32 and accommodates this in itself. The mandrel 32 has an outer circumferential face 33, which forms together with an inner circumferential face 35 of the mandrel tube 34 the third flow channel 25, i.e. the inner flow channel. For the radial support, the mandrel 32 has radially projecting webs 36, which are supported inside on the inner circumferential face 35 of the mandrel tube 34. The webs 36 are arranged circumferentially distributed along the circumference of the mandrel tube 34 and form between each other passage channels, so that the third flow channel 35 is continuous.

The mandrel tube 34 projects over the end face 29 and into the passage of the head portion 30. In this case, the mandrel tube 34 ends vertically in front of or above the mandrel 32. The lower end of the mandrel tube 34 forms together with the mandrel 32 the annular third outlet opening 26.

On the base element 28, furthermore a tube-like socket 37 is mounted, which is arranged coaxially to the mandrel 32 and to the mandrel tube 34 and accommodates the mandrel tube 34 internally. Between an inner circumferential face 38 of the socket 37 and an outer circumferential face 39 of the mandrel tube 34, a portion of the second flow channel 21, i.e. of the central flow channel, is formed. The socket 37 projects beyond the end face 29 and ends within the first manifold 15.

On the first manifold 15 a sliding tube 40 is mounted, which rests with an inner circumferential face 41 on an outer circumferential face 45 of the socket 37. The second flow channel 21 is, thus, formed in the further vertical extension directed downwards by the inner circumferential face 41 of the sliding tube 40 and the outer circumferential face 39 of the mandrel tube 34. Starting from the third outlet opening 26, the second flow channel 21 is formed by the inner circumferential face 41 of the sliding tube 40 and the outer circumferential face 33 of the mandrel 32, till the second flow channel 21 reaches the second outlet opening 22. In the position shown in FIG. 2 the sliding tube 40 is in contact at its lower end with the lower end of the mandrel 32 and closes, thus, the second flow channel 21.

Furthermore, on the first manifold 15 a socket 42 facing downwards is provided. An inner face 44 of the socket 42 forms together with an outer circumferential face 46 of the sliding tube 40 a portion of the first flow channel 17. The socket 42 projects into the head portion 30. In the further extension vertically downwards, the first flow channel 17 is formed by the inner circumferential face 41 of the head portion 30 and the outer circumferential face 46 of the sliding tube 40. At a vertical lower end of the head portion 30, the sliding tube 40 with its outer circumferential face 46 is in contact with the head portion 30 and closes the first flow channel 17.

For opening the first flow channel 17 and the second flow channel 21, the first manifold 15 is arranged vertically displaceably along the longitudinal axis L and can be moved from the position shown in FIG. 2 into a position, vertically displaced upwards. With it, the sliding tube 40 moves together with the first manifold 15, so that the sliding tube 40 lifts off the inner circumferential face 31 at the lower end of the head portion 30. The sliding tube 40 lifts at the lower end off the outer circumferential face 33 of the mandrel 32 and opens the second flow channel 21. Thus, extruded material extruded from the first flow channel 17 and the second flow channel 21 can exit from the first outlet opening 18 and from the second outlet opening 22. To ensure the displacement, the sliding tube 40 rests displaceably with its inner circumferential face 41 on the outer circumferential face 45 of the socket 37 of the base portion 28. Furthermore, the socket 32 of the first manifold 15 extends axially displaceably into the inner circumferential face 31 of the head portion 30.

Furthermore, the head portion 30 is separately axially displaceable, so that the first outlet opening 18 is opened by the axial lifting of the head portion 30, without opening at the same time the second outlet opening 22. Furthermore, the first manifold 15 and the head portion 30 can lift off synchronously, so that the first outlet opening 18 remains closed and only the second outlet opening 22 is opened.

The mixer 27 comprises a mixer housing 50 with a bore 52, wherein within the bore 52 a mixing element 47 is rotatably arranged. The mixing element 47 is formed shaft-like and is driven by the servomotor 10. The mixing element 47 has an outer circumferential face 49, on which mixing blades 48 are provided projecting radially outwards. The mixer housing 50 has an inner circumferential face 51 formed by the bore 52 and on which mixing blades 53 are provided projecting radially inwards, which mesh or interact with the mixing blades 48 of the mixer housing 50. By means of rotatingly driving the mixing element 47, the mixing blades 48 of the mixing element 47 are moved relative to the stationary mixing blades 53 of the mixer housing 50, so that a stirring of the extruded thermoplastic plastic material is achieved within the third flow channel 21. At a vertically upper end of the mixer 27, a connection 54 for a foaming agent is provided, so that a foaming agent can be introduced into the mixer 27 and is mixed by the mixing blades 48, 53 into the plasticized thermoplastic material.

The inner circumferential face 51 of the mixer housing 50 forms together with the outer circumferential face 49 of the mixing element 47 an annular or hose-like channel portion 55 of the second flow channel 21. The annular channel portion 55 merges in the vertically downwards directed extension in a bore-like channel portion 56. For this, the mixing element 47 ends, wherein the mixing element 47 tapers conically downwards to form a tip. The base portion 28 of the extrusion head 1 has in the further extension of the second flow channel 21 a tip 57, which expands conically and expands the material flow again annularly or hose-like.

Thus, with the extrusion head 1 of the first embodiment, a three-layered parison can be manufactured, which has an non-foamed outer first layer, a non-foamed inner third layer and a foamed second layer between the outer first layer and the inner third layer. For manufacturing such a parison, the first outlet opening 18 as well as the second outlet opening 22 is open. The third outlet opening 26 cannot be closed, wherein downstream of the third outlet opening 26, the third flow channel 25 and the second flow channel 21 merge, so that the second layer and the third layer exit together through the second outlet opening 22, as far as this is open.

If a portion of the parison shall have areas without foamed layer, the second outlet opening 22 is closed, so that in total only one layer, namely the non-foamed outer first layer, exits.

FIG. 3 shows a second embodiment of an extrusion head 1, wherein components, corresponding to components of the first embodiment, are provided with the same reference numerals and are described in connection with the first embodiment.

In contrast to the first embodiment, in the second embodiment the first outlet opening 18 is arranged downstream of the second outlet opening 22. The second outlet opening 22 is closable and closes only the second flow channel 21. Downstream of the second outlet opening 22, the first flow channel 17 and the third flow channel 25 can be closed together from the closable first outlet opening 22. When the second outlet opening 22 is open, the second flow channel 21 is additionally united with the first flow channel 17 and with the third flow channel 25, which can then be closed together by the first outlet opening 18.

When the first outlet opening 18 and the second outlet opening 22 are open, thus a formed part with a non-foamed outer first layer, a non-foamed inner third layer and a foamed second layer arranged therebetween is formed.

If only the second outlet opening 22 is closed, a two-layered moulded part is achieved with a non-foamed outer first layer and a non-foamed inner third layer.

REFERENCE NUMERALS LIST

1 extrusion head
2 connection
3 second extruder
4 third extruder
5 first temporary storage
6 second temporary storage
7 third temporary storage
8 connection
9 connection
10 servomotor
11 feed hopper
12 feed hopper
13 drive motor
14 drive motor
15 first manifold
16 first feed line
17 first flow channel
18 first outlet opening
19 second manifold
20 second feed line
21 second flow channel
22 second outlet opening
23 third manifold 24 third feed line
25 third flow channel
26 third outlet opening
27 mixer
28 base portion
29 end face
30 head portion
31 inner circumferential face
32 mandrel
33 outer circumferential face (of the mandrel)
34 mandrel tube
35 inner circumferential face (of the mandrel tube)
36 web
37 socket
38 inner circumferential face (of the fitting)
39 outer circumferential face (of the mandrel tube)
40 sliding tube
41 inner circumferential face (of the sliding tube)
42 socket
43 outer circumferential face (of the socket of the first manifold)
44 inner circumferential face (of the socket of the first manifold)
45 outer circumferential face (of the socket of the base portion)
46 outer circumferential face (of the socket tube)
47 mixing element
48 mixing blade
49 outer circumferential face (of the mixing element)
50 mixer housing
51 inner circumferential face (of the mixer housing)
52 bore
53 mixing blade
54 connection for a foaming agent
55 annular channel portion
56 bore-like channel portion
57 tip
L longitudinal axis

The invention claimed is:

1. Extrusion head for producing tubular parisons from extrudable plastic, which are made up from at least a first layer and a second layer, wherein the extrusion head comprises:
 a first manifold with a connection for a first extruder,
 a second manifold with a connection for a second extruder,
 a first flow channel with an annular first outlet opening for producing the first layer, wherein the first flow channel is fed by the first manifold,
 a second flow channel with an annular second outlet opening for producing the second layer, wherein the second flow channel is fed by the second manifold,
 a dynamic mixer arranged within the second flow channel with a connection for introducing a foaming agent, wherein the dynamic mixer comprises a mixer housing with a bore, a mixing element rotatingly drivable arranged within said bore, and a first annular channel portion between the bore of the mixer housing and the mixing element, wherein the first annular channel portion is part of the second flow channel,
 a bore shaped channel portion of the second flow channel downstream of the mixer, wherein the material flows out of the first annular channel portion of the mixer is joined in the bore shaped channel portion, and
 a second annular channel portion of the second flow channel is downstream of said bore shaped channel portion, wherein the material flows out of the bore shaped channel portion to the second annular channel portion.

2. Extrusion head according to claim 1, wherein a first set of mixing blades are arranged on an outer circumferential face of the mixing element.

3. Extrusion head according to claim 2, wherein a second set of mixing blades, which interact with the first set of mixing blades of the mixing element, are provided on an inner circumferential face of the mixer housing.

4. Extrusion head according to claim 1, wherein the connection for introducing a foaming agents is provided on the mixer housing, wherein a foaming agent feed line leads to the first annular channel portion.

5. Extrusion head according to claim 1, wherein a servomotor is provided for driving the mixing element of the mixer with a variable rotational speed.

6. Extrusion head according to claim 1, wherein upstream of the mixer, a shut-off valve is provided.

7. Extrusion head according to claim 1, wherein the first outlet opening and/or the second outlet opening can be closed.

8. Extrusion head according to claim 1, wherein the second outlet opening is arranged such, that the second layer is arranged within the first layer.

9. Extrusion head according to claim 1, wherein a third manifold with a connection is provided for a third extruder and
 wherein a third flow channel is provided with an annular third outlet opening for producing a third layer, wherein the third flow channel is fed by the third manifold.

10. Extrusion head according to claim 9, wherein the third outlet opening is arranged such, that the third layer is arranged within the second layer.

11. Extrusion head according to claim 9, wherein the second outlet opening is arranged downstream from the third outlet opening or
 wherein the first outlet opening is arranged downstream of the second outlet opening and the third outlet opening.

12. Extrusion machine with an extrusion head according to claim 1, wherein in front of each manifold a temporary storage is provided for the extruded material.

13. Method for operating an extrusion head according to claim 1, in which the pressure within the second flow channel is held at a defined value.

14. Method according to claim 13, wherein, when falling below the pressure within the second flow channel, the pressure is regulated by means of adapting the expelling velocity of a second temporary storage for the extruded material arranged in front of the extrusion head.

15. Method according to claim 13, wherein the temperature within the second flow channel is adjusted to a different value than within the other flow channels.

* * * * *